Patented July 7, 1942

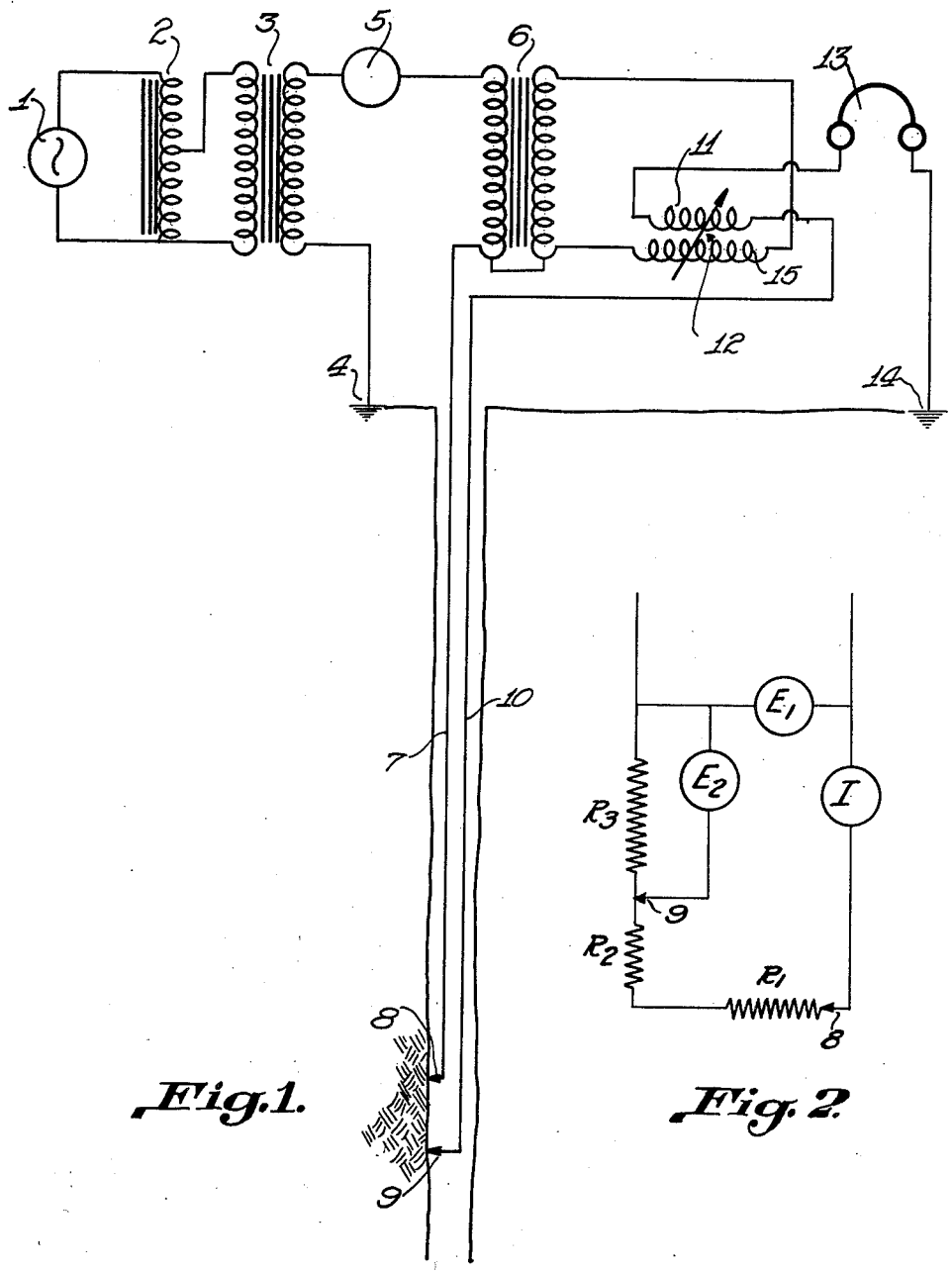

2,288,884

UNITED STATES PATENT OFFICE

2,288,884

ELECTRICAL LOGGING IN OIL-FILLED WELLS

Merle C. Bowsky, Los Angeles, Calif., assignor to Lane-Wells Company, Los Angeles, Calif., a corporation of Delaware Application December 11, 1939, Serial No. 308,614

5 Claims. (Cl. 175—182)

My invention relates to electrical logging in oil-filled wells, and among the objects of my invention are:

First, to provide a method and apparatus for investigating formation confronting a well bore when the well bore is filled with a non-conductive liquid such as oil;

Second, to provide a method and apparatus of this character in which the electrodes are adapted to make actual physical contact with the walls of the well bore;

Third, to provide a method and apparatus of this character whereby the inherent variation in contact resistance between the movable electrodes and the walls of the well bore has no appreciable effect upon the operation of the measuring apparatus, that is, such variation in contact resistance as might exist between the contact electrodes and the well bore does not mask or destroy the value of the electrical measurements being made;

Fourth, to provide a method and apparatus of this character which is equally operable whether the two, three or four-electrode system of electrical logging is used, that is, whether two, three or four electrodes are movable within the well bore, or whether certain of the electrodes are connected to the surface casing or to the ground at the surface of the well; and Fifth, to provide, on the whole, a novelly arranged means and simply executed method of electrical logging oil-filled well bores.

With the above and other objects in view, as may appear hereinafter, reference is directed to the accompanying diagrams in which: Figure 1 is a wiring diagram of a typical circuit employed in the exercise of my invention; and Figure 2 is a resistance analogy of the circuit shown in Figure 1.

In the course of drilling wells it is sometimes desirable to use oil as a drilling fluid in place of mud, particularly when approaching or passing through a productive zone. Oil is used so that the productive zones will not become contaminated with water infiltration. It has long been recognized that the drilling mud, particularly water which has filtered through the mud into the producing formation, greatly damages and often materially reduces the output from the well. The mud accumulates on the walls of the producing zone and the water drives back the oil which would otherwise be present. Furthermore, particularly if the water pressure is considerably higher than the formation pressure, water may flow into the formation far enough to make it exceedingly difficult to determine whether or not the zone is actually an oil-producing zone. In drilling with oil-drilling fluid the difficulties inherent in the use of mud are overcome, but the problem of electrical logging the formation so as to determine the location of the oil-producing strata is materially handicapped for the reason that the conductive fluid column formed by the drilling mud, and necessary for conventional electrical logging, is absent.

The problem cannot be solved by merely substituting contact electrodes for ordinary electrodes suspended in the fluid column, for the electrodes must be moved, causing such a wide fluctuation in contact resistance that the electrical characteristics of the formation desired to be measured are completely masked.

In short, the method and apparatus herein disclosed is so devised that the contact resistance change does not materially affect or mask the result. With reference to the drawing, a source of alternating current 1 is fed through a variable regulating transformer 2 so that its voltage output may be regulated. The power output from the regulating transformer 2 is passed through a constant current transformer 3; that is, a transformer which, within limits determined by the design of the transformer, tends to maintain a constant current output although the circuit incorporating its secondary may vary in resistance. Characteristically, the secondary voltage of such transformer changes with the resistance in the secondary circuit; if the resistance increases the secondary voltage increases so that the current in the secondary circuit remains constant. One side of the secondary of this transformer is connected to a ground electrode 4, while the other side passes through an ammeter 5 and through the primary winding of a feed coil 6 to a conductor 7 of a cable and to a current contactor 8 at the lower end of the cable. The contactor is designed to make physical contact with the walls of the formation. The remaining winding of the feed coil 6 is connected in a circuit with the primary 15 of the variometer 12. The portion of the applied current obtained through the feed coil 6 and flowing through the primary 15 of the variocoupler provides an opposing voltage to balance the potential picked up by the probe circuit, as will be described hereinafter.

A potential contactor 9 also engages the walls of the formation and is connected by a conductor 10 to the secondary 11 of a variometer 12. The circuit is completed through a pair of head phones 13 to a ground electrode 14. The ground electrodes 4 and 14 may be located at the surface or may, in fact, be additional contact electrodes, or either may be so arranged, depending upon whether a two, three or four-contact system is desired.

Reference is now made to Figure 2 and the resistance analogy diagram shown therein, in which:

$R_1$ is the contact resistance of current input electrode 8.

$R_2$ is the resistance of the formation contained in the sphere having electrode 8 as the center and the radius between electrodes 8 and 9.

$R_3$ is the resistance of that portion of the formation being sampled by the probe circuit.

$I$ is the current in the input circuit which is held constant by transformer 3.

$E_1$ is the potential in the input circuit.

$E_2$ is the potential in the probe circuit.

Considering the basic formula, $E=IR$, it is obvious that if $I$ is constant, $E$ varies with $R$. $E_1$ will, of course, vary with change in any one of resistances, $R_1$, $R_2$ and $R_3$ or the algebraic change in all of them according to formula $E_1 = I(R_1+R_2+R_3)$. But $E_2$, which is the potential across $R_3$ only, is uninfluenced by changes in $R_1$ and $R_2$ as long as the current $I$ remains constant. Thus, if the contact resistance $R_1$ increases, $E_1$ increases to maintain $I$ constant so that the drop or $E_2$ across $R_3$ is unaffected; conversely, if the resistance $R_1$ or $R_2$ decreases, $E_1$ will decrease and $I$ will remain constant so that $E_2$ is still unchanged.

It follows then that the one quantity which it is desired to measure, namely, resistance $R_3$, is the only resistance which influences $E_2$ of the probe circuit as long as $I$ remains constant.

Both the constant current transformer and the variocoupler with its primary coil tend to compensate for the effects of changing contact resistance as the electrodes are moved continuously along the wellbore. With regard to the variocoupler, the balancing voltage in the primary 15 is affected by the total resistance of the input circuit. However, under the conditions of operation in an oil-filled wellbore and employing an electrode making physical contact with the formation, the principal variation in the resistance in the input circuit occurs between the input electrode and the formation; that is, although the formation itself between the electrodes of the input circuit constitutes another variable resistance, its magnitude is materially less than the variation in contact resistance so that for practical purposes the change in voltage of the primary coil can be considered as due to the variation in contact resistance only.

It should be borne in mind, however, that while the actual "null" point may not vary, the difficulty of determining this null point increases as the field strength measured by the probe electrode becomes weaker. In other words, there is a threshold value on each side of the null point below which detection cannot be made, so that the null point is broad or narrow, depending on the strength of the field picked up by the probe circuit. Naturally, the broader the null point the more difficulty encountered in establishing its location.

The constant current transformer tends to compensate for changes in resistance in the input circuit. As stated above, the principal cause of resistance change is the contact between the formation and input electrode; thus when the contact resistance of the input electrode increases, the voltage output from the transformer increases so as to maintain constant the current in the field being sampled by the probe circuit.

Within the ability of the transformer to maintain a constant current, no compensation is required in the variocoupler. Actually, the contact resistance may at times exceed the ability of the constant current transformer so that the added means of compensation afforded by the variocoupler is helpful.

As long as the actual null point is maintained with reasonable accuracy, the contact resistance of the probe electrode has no material effect, but any appreciable deviation from the null point will, of course, introduce spurious indications.

Briefly, my method of electrically logging oil-filled wells consists in establishing an input circuit and a probe circuit, each having at least one contactor engaging the walls of the oil-filled well bore; inductively coupling the two circuits; and providing current regulation in the input circuit so that it compensates for variations in the contact resistance of the current or input electrode.

By reason of the variocoupler 12 the potential of the probe electrode or contactor 9 is balanced by the input circuit so that measurement is made when no current is flowing in the probe circuit. In a hand-controlled device the head phones aid in determining the "null" or balance point as the tone subsides to a minimum or to zero when the balance point is reached. Actually, conventional automatic recording apparatus is employed such as shown in the Bowsky et al. Patent No. 2,142,555, but the circuit thereof is basicly the same; that is, position of the variocoupler is determined by balancing the probe circuit until no current is flowing. Such systems, whether manual as illustrated, or automatic, are termed "null balance" systems.

Assuming that measurement is made when an absolute balance is obtained, no current would flow at the contactor 9 and, consequently, variation in resistance between the contactor 9 and the formation would have no effect. This ideal is, of course, impossible to obtain, but may be approached within practical limits so that changes in contact resistance of contactor 9 does not materially affect the measurements.

Thus, with my method herein disclosed, varying contact resistance of all the electrodes or contactors, whether in the input circuit or probe circuit, and whether moving or fixed, is, for all practical purposes, eliminated.

Various changes and alternate arrangements may be made within the scope of the appended claims, in which it is my intention to claim all novelty inherent in the invention as broadly as the prior art permits.

I claim:

1. An apparatus for electrical logging of oil-filled well bores, comprising: an input circuit and a probe circuit, each including at least one continuously movable contactor physically engaging the walls of said well bore, the input circuit being adapted to establish an electrical field in the formation confronting said well bore and said probe circuit being adapted to sample said electrical field; and an electrical coupling between said input and probe circuits, including means in said input circuit for balancing the voltage in said probe circuit, said means being so located in said input circuit with respect to said input contactor that the balancing voltage of said means varies directly with the total resistance of said input circuit, including the contact resistance of said input contactor and means tending to maintain a constant current flow in said input circuit.

2. An apparatus for electrical logging of oil-filled well bores, comprising: an input circuit and a probe circuit, each including at least one continuously movable contactor physically engaging the walls of said well bore, the input circuit being adapted to establish an electrical field in the formation confronting said well bore and said probe circuit being adapted to sample said electrical field; a variocoupler having a primary coil in said input circuit and a secondary coil in said probe circuit, the primary coil being so located in the input circuit that the current flowing therethrough tends to vary with changes in the total resistance of said input circuit, including the contact resistance of said input contactor.

3. An apparatus, as set forth in claim 2, wherein said input circuit includes a source of alternating current and a constant current transformer tending to maintain a uniform current flow through said input contactor to the formation.

4. In an apparatus for logging oil-filled wellbores wherin the fluid within the wellbore is relatively non-conductive and wherein input and probe circuts are provided, including in each cirsuit at least one continuously movable electrode in physical and electrical contact of a fluctuating character with the formation confronting the wellbore, of means for compensating for said fluctuations in said electrical contact, comprising: a constant current transformer in the input circuit tending to vary the voltage therein in proportion to changes in contact resistance between said input electrode and the formation, whereby a substantially constant current field strength is maintained in said formation by said input circuit.

5. In an apparatus for logging oil-filled wellbores wherein the fluid within the wellbore is relatively non-conductive and wherein input and probe circuits are provided, including in each circuit at least one continuously movable electrode in physical and electrical contact of a fluctuating character with the formation confronting the wellbore, of means for compensating for said fluctuations in said electrical contact, comprising: a constant current transformer in the input circuit tending to vary the voltage therein in proportion to changes in contact resistance between said input electrode and the formation, whereby a substantially constant current field strength is maintained in said formation by said input circuit; and a variocoupler having a primary or balancing coil in said input circuit and a secondary coil in said probe circuit, said balancing coil tending to compenate for variations in the contact resistance between said input electrode and the formation occurring by reason of resistance changes in said input circuit in excess of the ability of said constant current transformer.

MERLE C. BOWSKY.